No. 710,503. Patented Oct. 7, 1902.
L. NEWMAN.
APPARATUS FOR HEMMING GARMENTS.
(Application filed June 17, 1899.)
(No Model.) 11 Sheets—Sheet 1.

Witnesses
Lindsay A. B. Little
Walter Tamariez

Inventor
Leopold Newman
By Kay & Totten
Attorneys

No. 710,503. Patented Oct. 7, 1902.
L. NEWMAN.
APPARATUS FOR HEMMING GARMENTS.
(Application filed June 17, 1899.)
(No Model.) 11 Sheets—Sheet 2.

No. 710,503. Patented Oct. 7, 1902.
L. NEWMAN.
APPARATUS FOR HEMMING GARMENTS.
(Application filed June 17, 1899.)
(No Model.) 11 Sheets—Sheet 6.

Witnesses
Lindsay B. Little
Walter Sansing

Inventor
Leopold Newman
By Kay & Totten
Attorneys

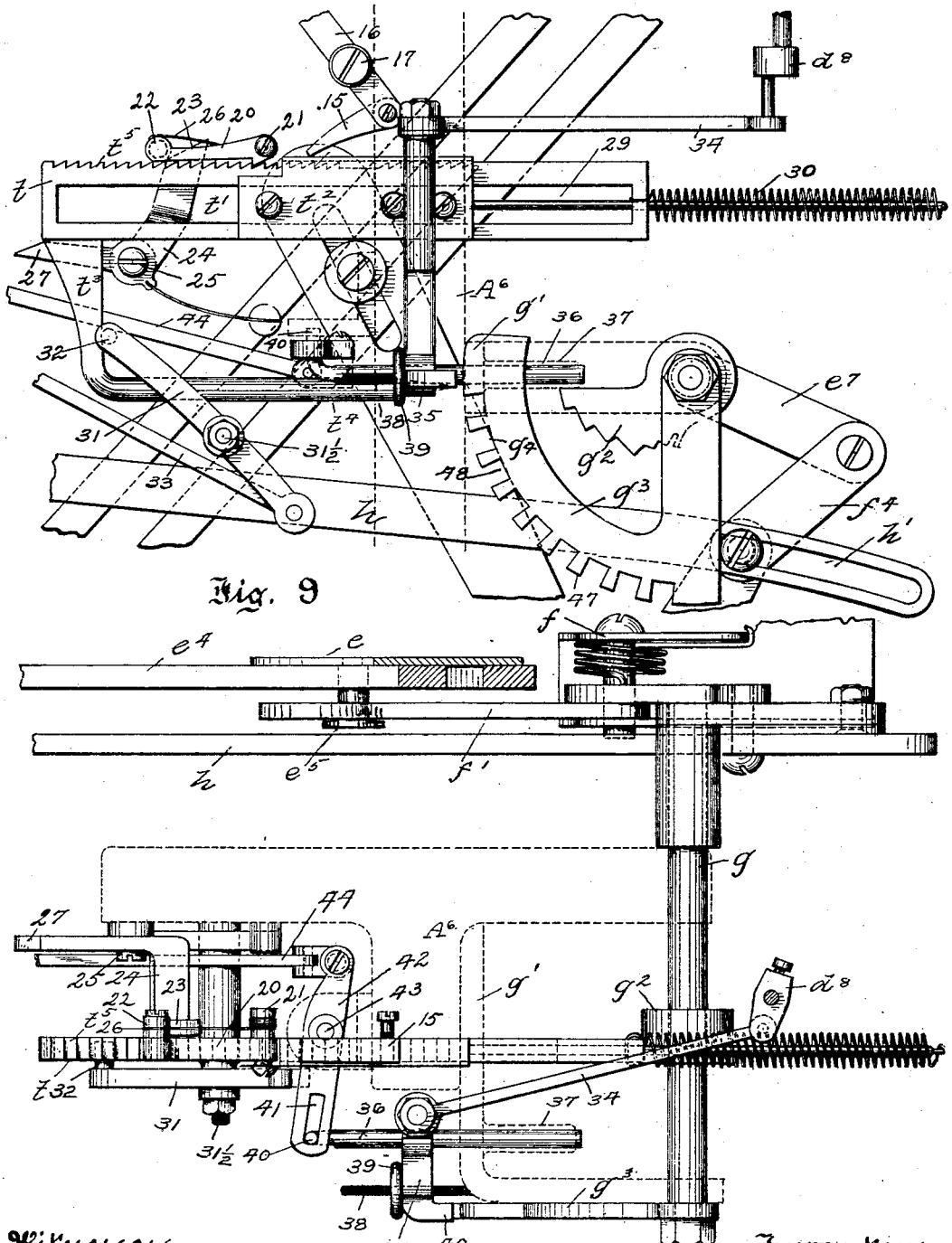

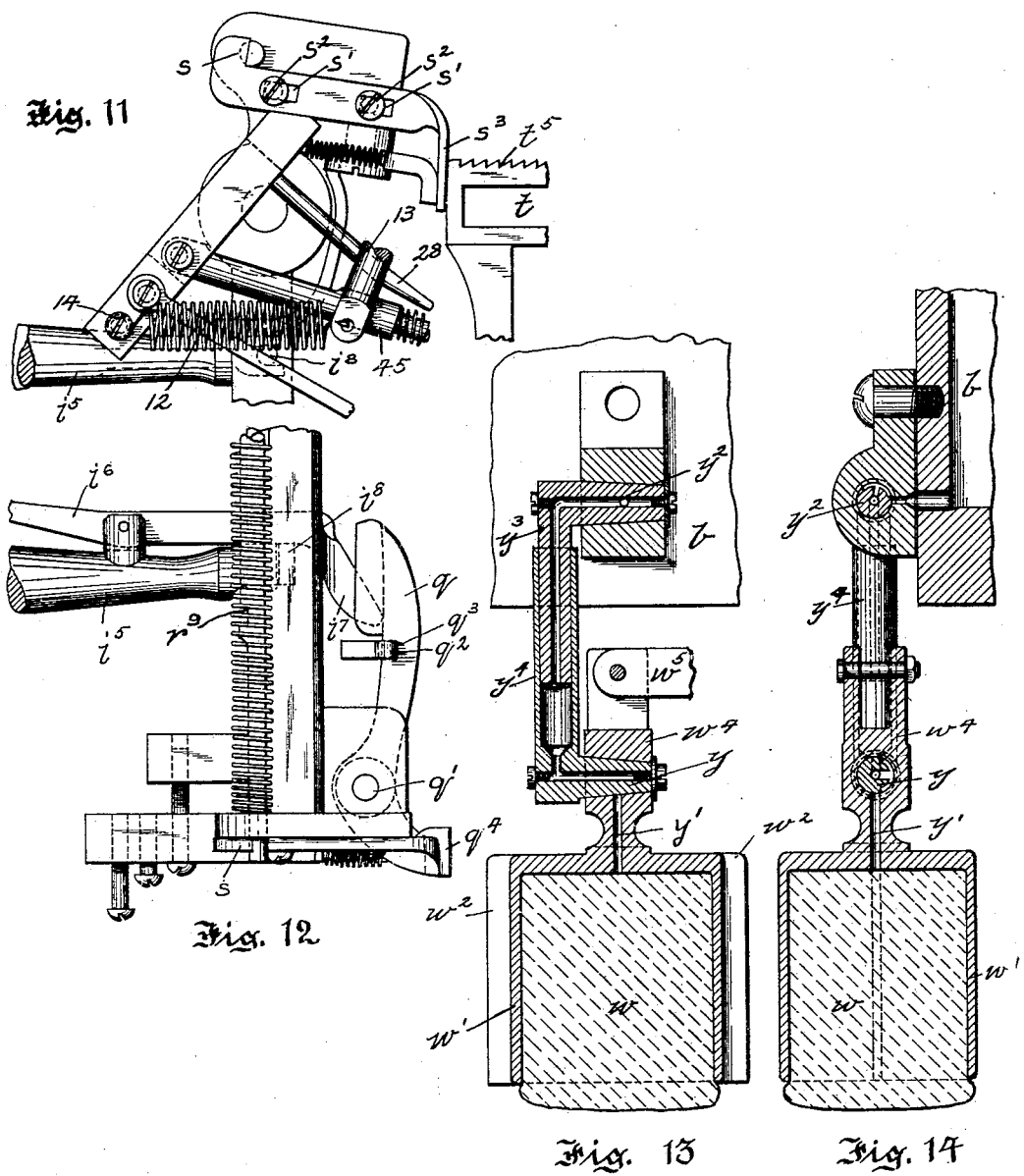

No. 710,503. Patented Oct. 7, 1902.
L. NEWMAN.
APPARATUS FOR HEMMING GARMENTS.
(Application filed June 17, 1899.)
(No Model.) 11 Sheets—Sheet 9.

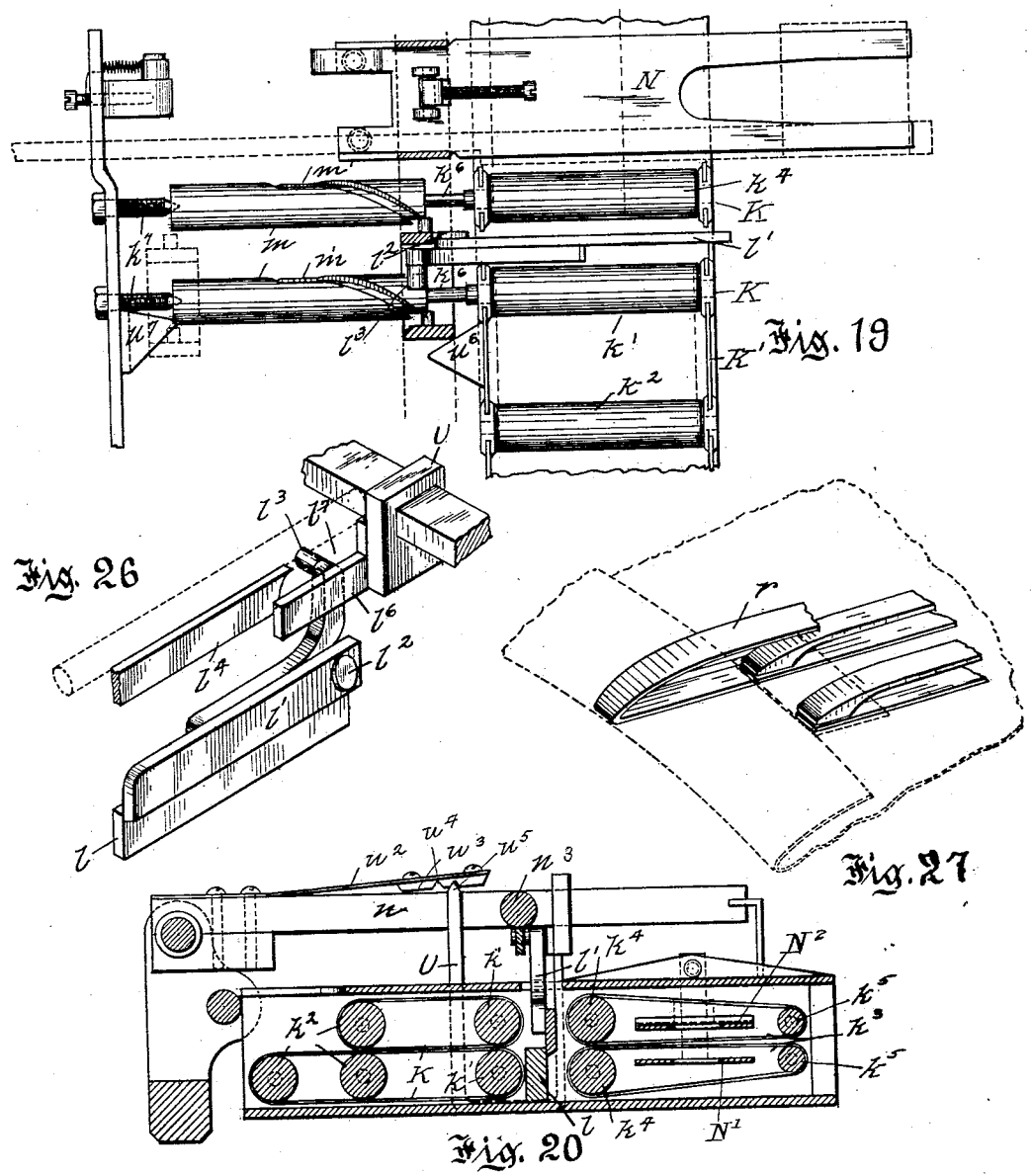

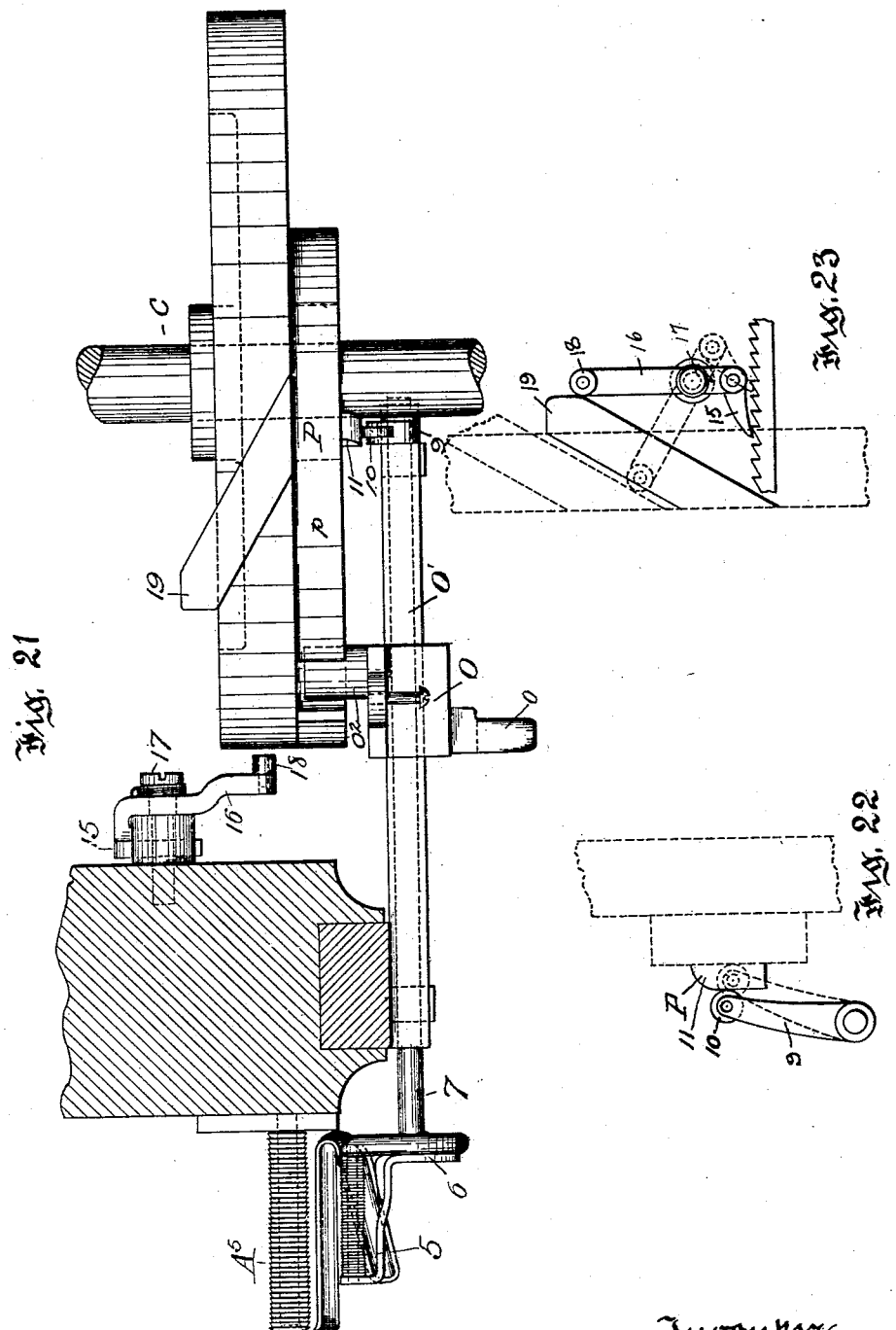

UNITED STATES PATENT OFFICE.

LEOPOLD NEWMAN, OF BRADDOCK, PENNSYLVANIA.

APPARATUS FOR HEMMING GARMENTS.

SPECIFICATION forming part of Letters Patent No. 710,503, dated October 7, 1902.

Application filed June 17, 1899. Serial No. 720,910. (No model.)

*To all whom it may concern:*

Be it known that I, LEOPOLD NEWMAN, a resident of Braddock, in the county of Allegheny and State of Pennsylvania, have invented a new and useful Improvement in Apparatus for Hemming Garments and the Like; and I do hereby declare the following to be a full, clear, and exact description thereof.

My invention relates to machines for finishing and sealing the turned-up ends of trousers-legs, skirts, and other garments and articles, the object being to provide a suitable mechanism whereby the said operation may be greatly facilitated, thus doing away with the laborious method now in use.

The present mode of procedure in hemming a certain class of trousers-legs is to first turn up the desired amount of lower end of said trousers-leg and insert a strip of gum-tissue between the folds thereof, the turned-up end then being basted, thus holding the gum-tissue in place. The operator next moistens the turned-up portion and applies a hot iron thereto, which presses the fold and melts the gum-tissue sufficiently to allow the turned-up portion to be securely cemented to the body of the trousers-leg. The bastings are then removed and the operation is completed. The operation as thus described is a laborious one, and great care must be taken to finish the work properly and evenly.

My invention provides for the performance of all the above-mentioned operations by the use of certain mechanism, the basting operation excepted, which is unnecessary in the practice of said invention.

To these ends my invention consists in certain novel features of construction, which will be more fully described and claimed hereinafter.

To enable others skilled in the art to make and use my invention, I will describe the same more fully, referring to the accompanying drawings, in which—

Figure 1:
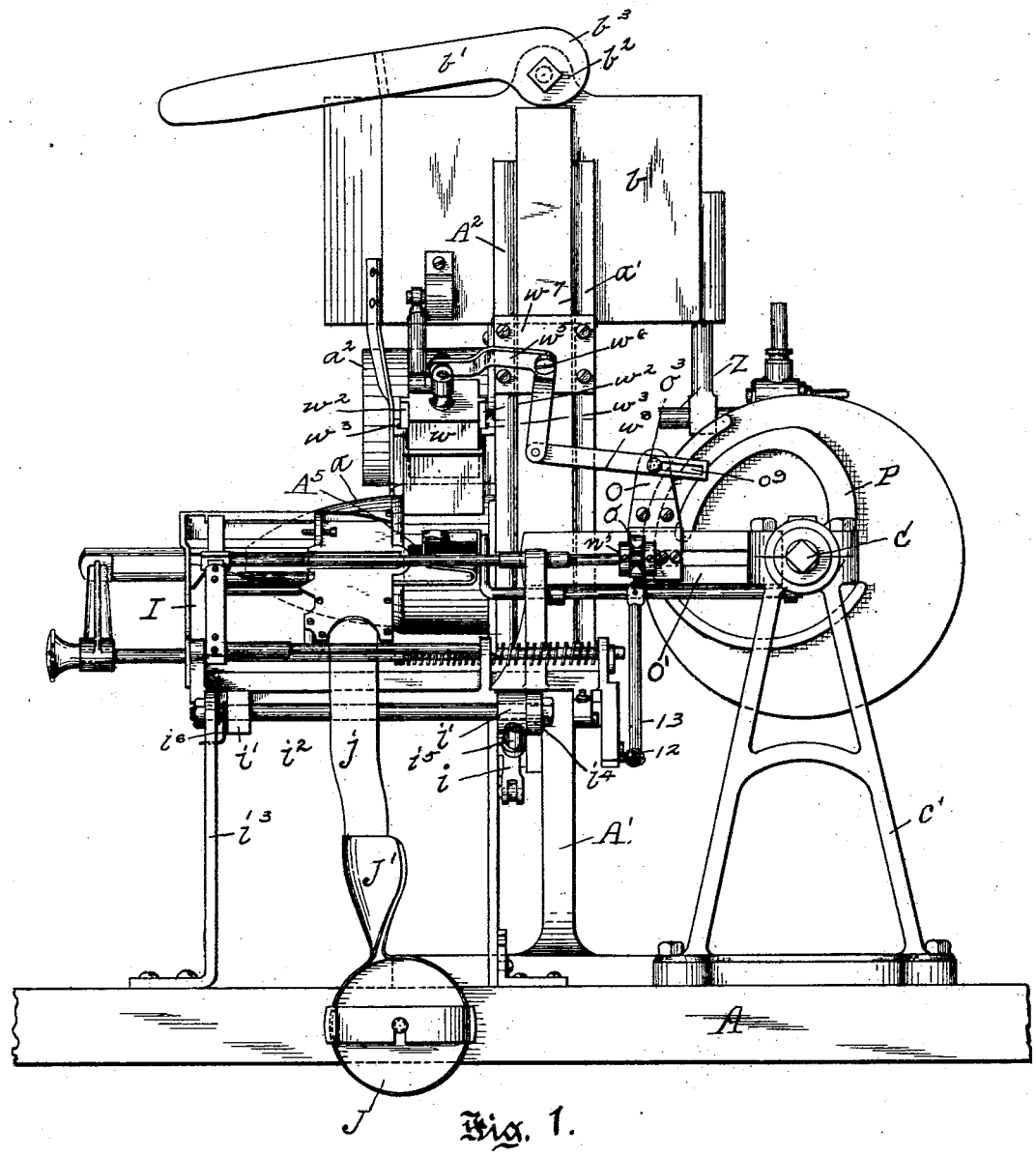
Figure 28:
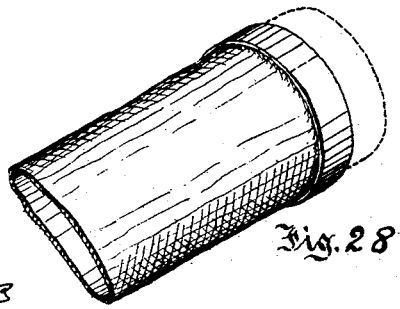
Figure 2:
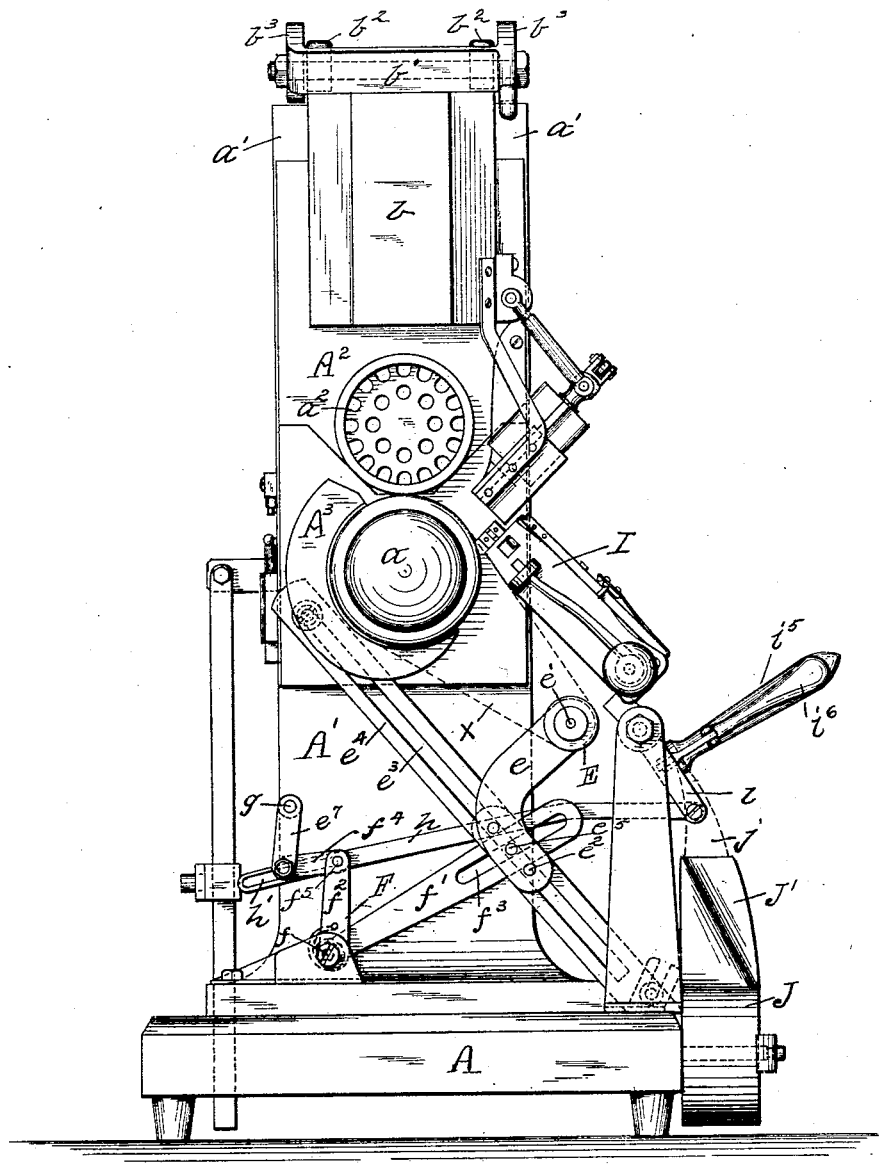
Figure 25:
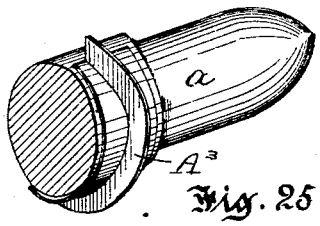
Figure 3:
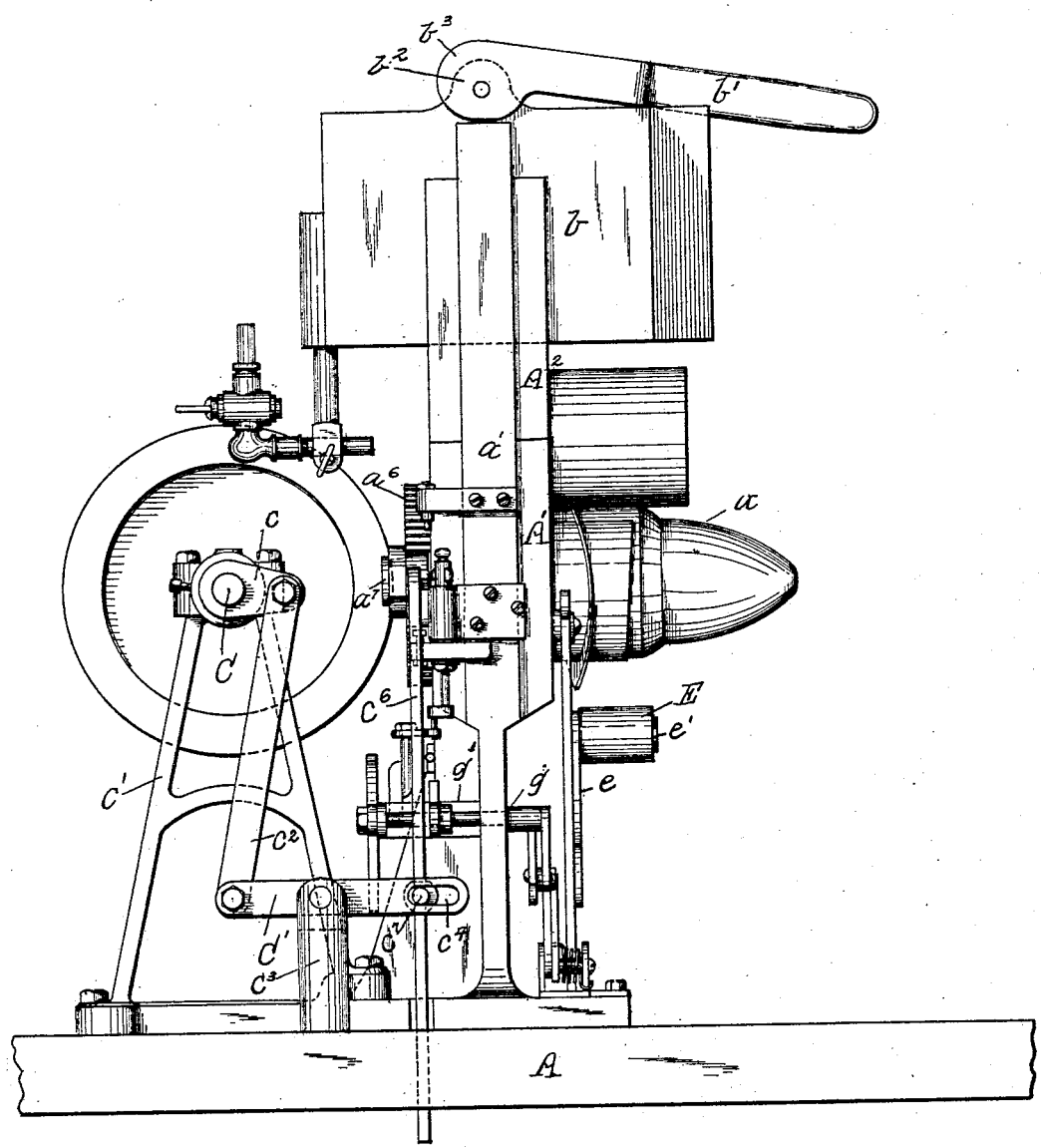
Figure 4:
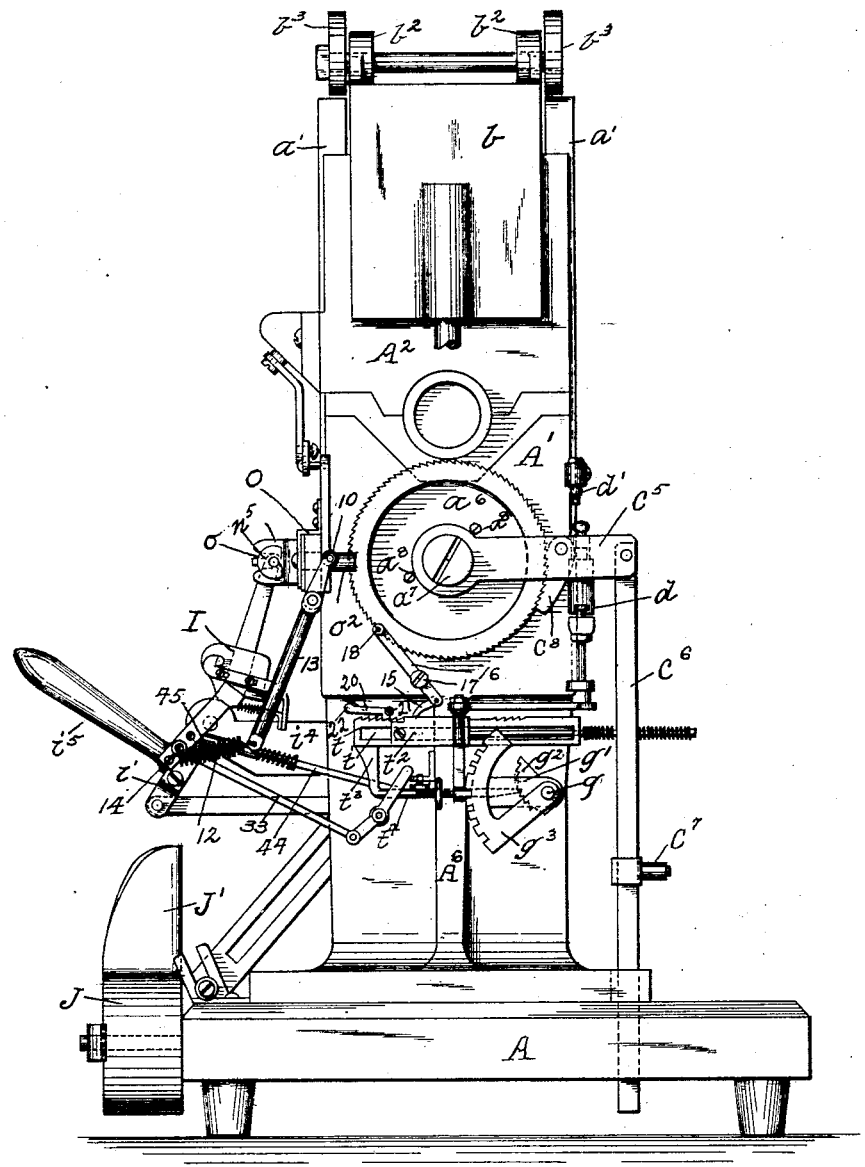
Figure 5:
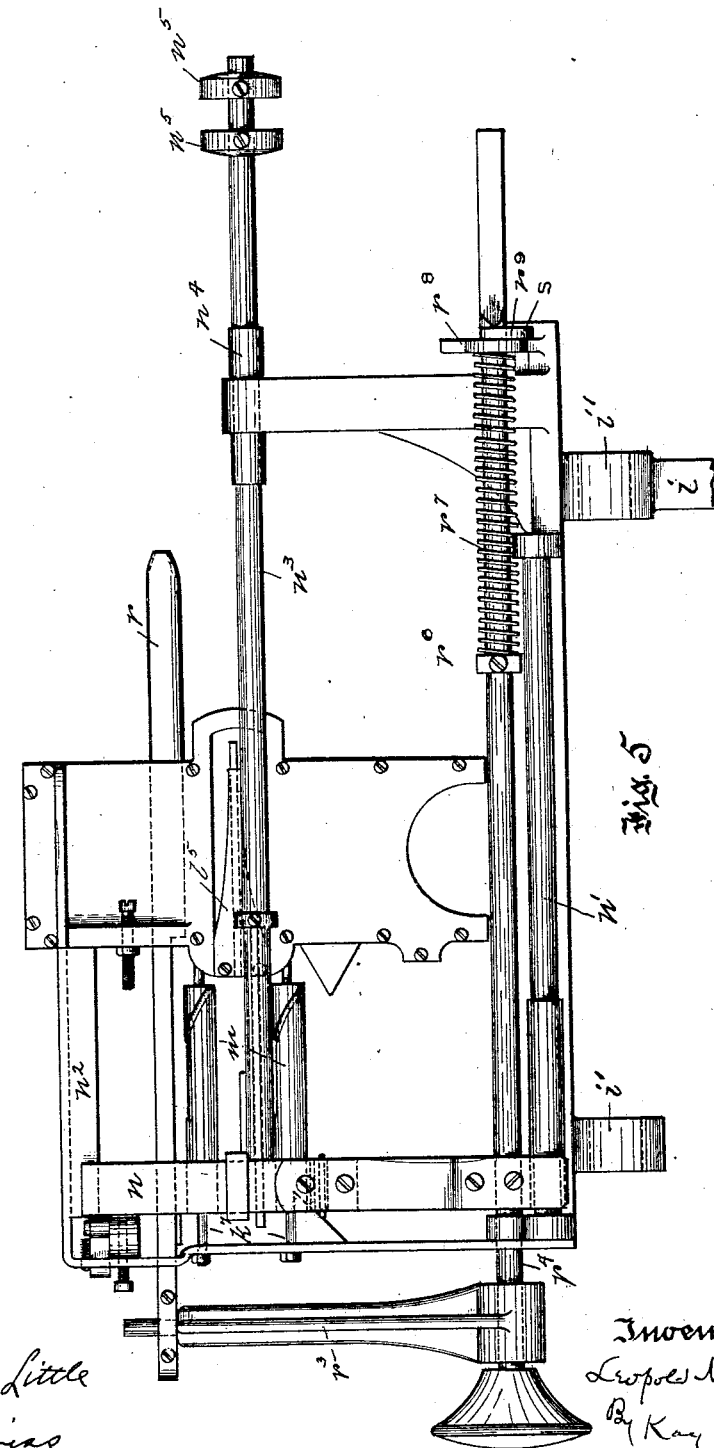
Figure 6:
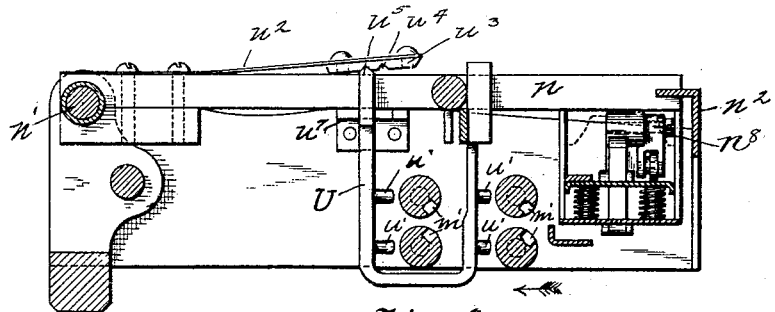
Figure 7:
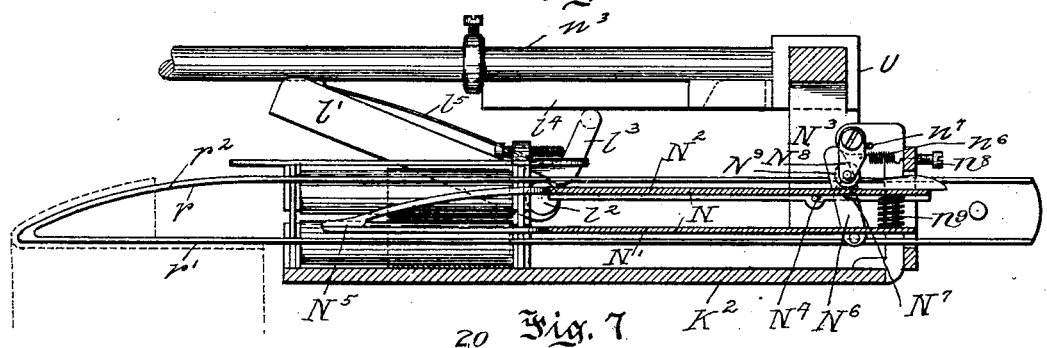
Figure 8:
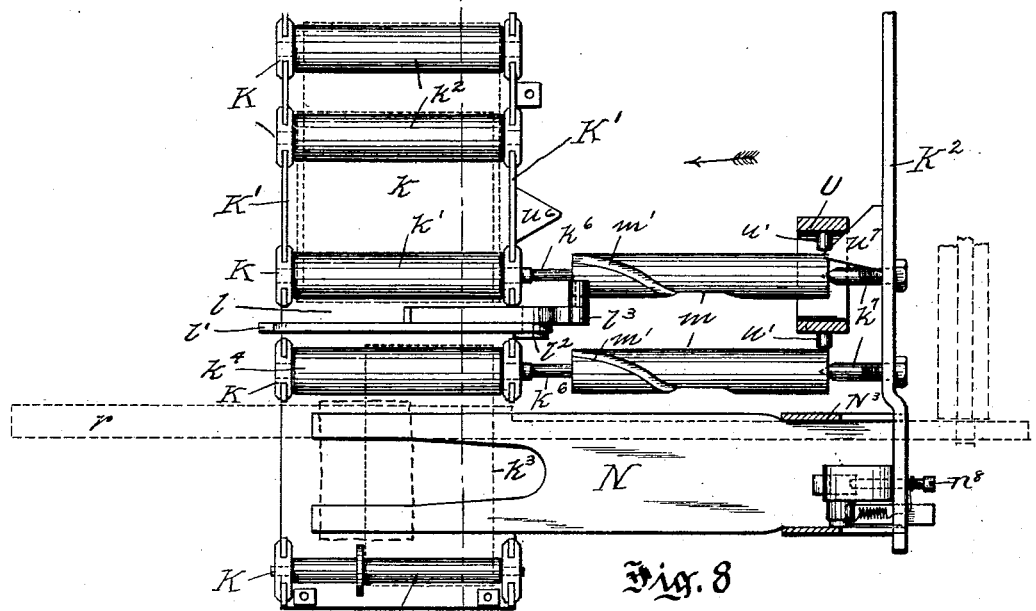
Figure 24:
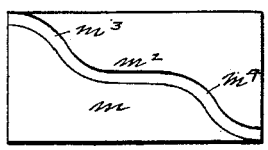
Figure 15:
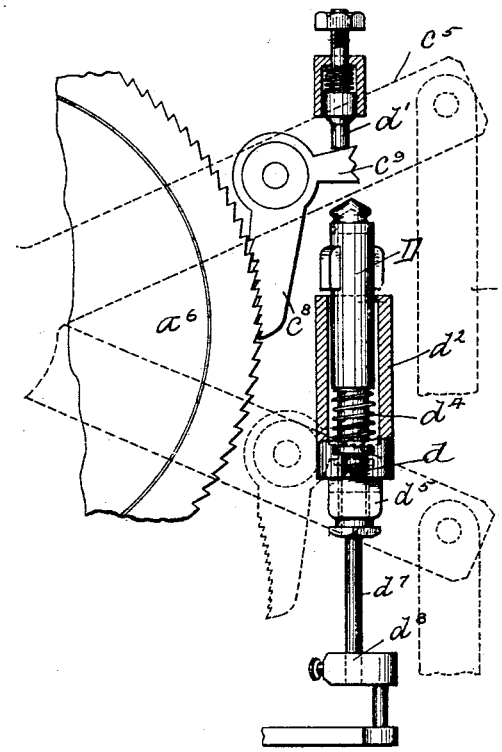
Figure 16:
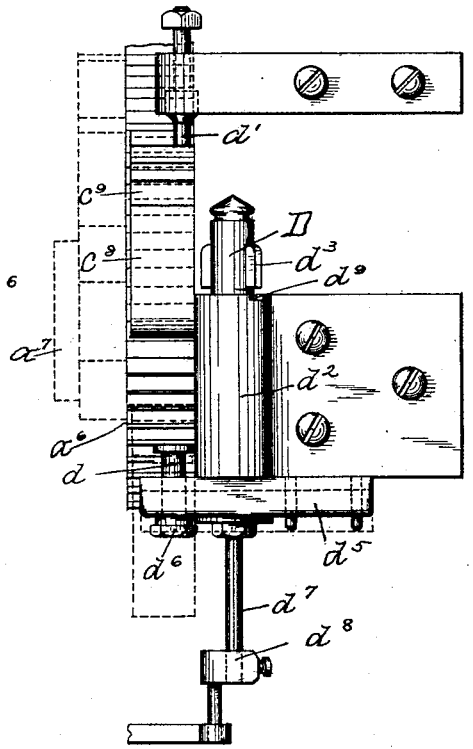
Figures 17, 18:
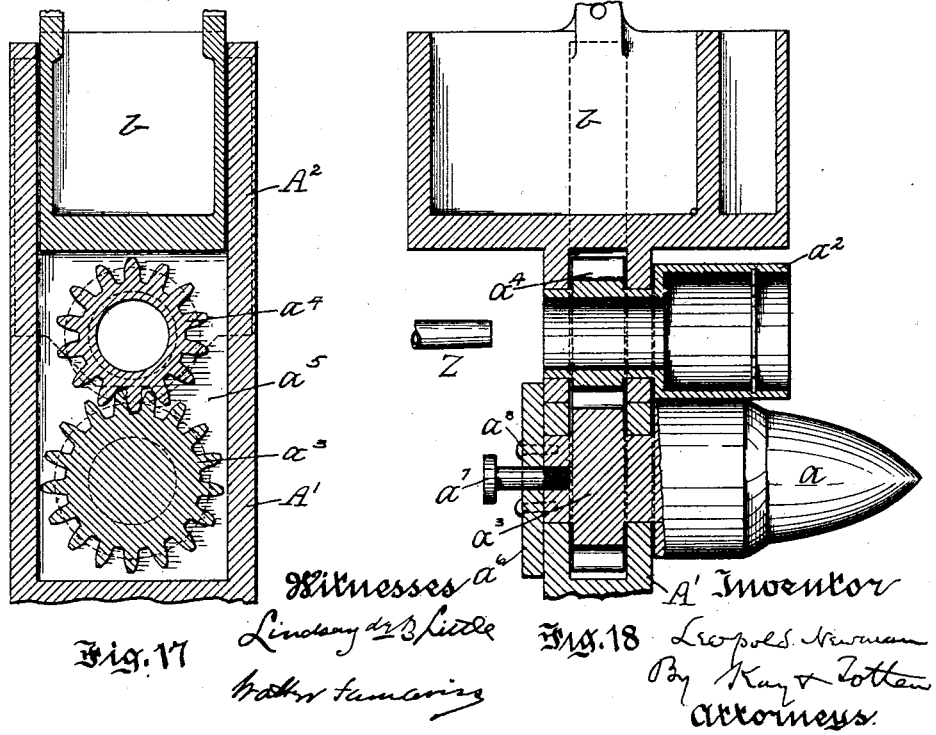

Figure 1 is a side elevation of my machine. Fig. 2 is a front view. Fig. 3 is a side elevation opposite to that shown in Fig. 1. Fig. 4 is a rear view with certain parts removed. Fig. 5 is a detail of the frame carrying the mechanism for inserting the gum-tissue. Figs. 6, 7, and 8 are details of certain portions thereof. Figs. 9, 10, 11, and 12 are details of the mechanism for automatically throwing said frame out of operation. Figs. 13 and 14 are detail sections showing the means for moistening the goods to be operated upon. Figs. 15 and 16 are details of the spacing devices. Figs. 17 and 18 are sections showing the spindle and cylinder and manner of gearing same. Fig. 19 is a plan view, partially in section, showing the manner of operating the mechanism for feeding and cutting the gum-tissue. Fig. 20 is a cross-section of said mechanism, taken on line 20 20, Fig. 8. Fig. 21 is a detailed plan view of the cam and certain parts operated thereby. Figs. 22 and 23 are details of portions thereof. Fig. 24 is a diagrammatic view of the grooved cylinder for operating the feed mechanism referred to in Fig. 19 and showing the surface of said cylinder rolled out. Fig. 25 is a detail in perspective of the spindle and former. Fig. 26 is a detail in perspective of the knife for cutting the gum-tissue and means for operating same. Fig. 27 is a perspective view showing the manner of inserting the gum-tissue within the fold of trousers-leg, and Fig. 28 is a perspective view showing the trousers-leg turned up at bottom ready to be inserted in the machine.

Like letters of reference indicate like parts in each view.

The reference-letter A indicates a suitable table to which the several parts of the machine are secured. A suitable acorn-shaped spindle $a$ is journaled in the housing A', said spindle extending out in front of the housing and being adapted to receive the end of trousers-leg to be operated upon. The housing A' is secured to the table A and has the guides $a'$ extending up therefrom, said guides being adapted to receive the movable block $A^2$. A hollow cylinder $a^2$ is journaled in the lower end of said movable block $A^2$, said cylinder projecting out in front of said block just above the spindle $a$ and in close proximity thereto. The shafts of said spindle $a$ and hollow cylinder $a^2$ carry the intermeshing gears $a^3$ and $a^4$, respectively, which, as shown in Figs. 17 and 18, work in the opening $a^5$, formed partly in the housing A' and partly in sliding block $A^2$, the gear $a^4$ being preferably of smaller diameter than gear $a^3$, thus imparting a more rapid movement to the cylinder $a^2$ than to spindle $a$. A ratchet-wheel $a^6$ is secured to the rear end of spindle-shaft by means of the screw $a^7$ and keyed thereto by means of the tap-screws $a^8$, said ratchet-wheel being located against the rear face of housing $A'$.

The movable block $A^2$ carries the reservoir $b$, which serves as a weight to hold said block down and is adapted to contain water for moistening the goods, said moistening operation being performed in a manner more fully hereinafter described. Pivotally secured to the lugs $b^2$ of said reservoir is the bifurcated lever $b'$, the bifurcated ends of said lever having the eccentrics $b^3$ formed upon their lower ends, said eccentrics being adapted to rest upon the upper faces of guides $a'$ and when lever $b'$ is thrown over from the position shown in Fig. 3 act to raise said reservoir $b$ and block $A^2$, thus raising cylinder $a^2$ away from the spindle $a$. The lever $b'$ may be operated by hand or may be connected to a pedal, if desired, in position to be pressed by the foot of the operator to move said lever $b'$ and raise or lower said parts carrying hollow cylinder. When the cylinder $a^2$ is thus raised, the end of the trousers-leg may be placed over the spindle $a$, and by throwing the lever $b'$ over to position shown in Figs. 1 and 3 the block $A^2$ will be lowered and the cylinder $a^2$ allowed to rest upon the goods, holding them tightly between said cylinder $a^2$ and spindle $a$.

To the rear of the housing $A'$ are the standards $c'$, suitably secured to the table A and adapted to receive and form bearings for the main driving-shaft C. The shaft C may be rotated by hand, for which a suitable crank may be attached to the end of said shaft, or, if desired, a pulley may be substituted for said crank and power applied from a suitable power-shaft by means of a belt.

Keyed to the rear end of power-shaft C is the crank-arm $c$, said arm being connected to one end of walking-beam $C'$ by the link $c^2$. The walking-beam is pivoted at or near its center to the support $c^3$ and has at one end the slot $c^4$. A lever $c^5$ is loosely pivoted at one end upon the screw-bolt $a^7$, its opposite end being pivoted to the vertically-movable rod $c^6$, the lower end of said rod passing through a guideway in the table A and carries the stud $c^7$, which projects into the slot $c^4$ of walking-beam $C'$. Motion is thus imparted from crank $c$ through link $c^2$ and walking-beam $C'$ to the rod $c^6$, thus imparting an oscillating movement to lever $c^5$. The lever $c^5$ has the toothed pawl $c^8$ pivoted thereto and on the inner face thereof, the teeth of said pawl being adapted to engage the teeth of ratchet-wheel $a^6$ as the lever $c^5$ descends to partially rotate said ratchet-wheel. When the lever $c^5$ has descended and reached a certain point, pawl $c^8$ is disengaged from said ratchet-wheel by the lug $c^9$ of said pawl coming in contact with a stop $d$, as shown in dotted lines, Fig. 15. As the lever $c^5$ is raised said lug $c^9$ comes in contact with the stop $d'$, forcing the teeth of pawl $c^8$ into contact with teeth of ratchet-wheel $a^6$ and insuring its engagement therewith and a further partial rotation of ratchet-wheel $a^6$ as lever $c^5$, carrying pawl $c^8$, again descends. Thus it will be seen that the constant rotation of main driving-shaft C imparts through the mechanism just described an intermittent rotary movement to ratchet-wheel $a^6$, and consequently to the spindle $a$, and likewise through the gearing $a^3$ and $a^4$ to the hollow cylinder $a^2$.

A stretcher-roller E is journaled on the pin $e'$, projecting at right angles from the bracket $e$, said bracket carrying the screws $e^2$, which project through a slot $e^3$ in a guide-plate $e^4$. The guide-plate $e^4$ extends at an angle of about forty-five degrees across the face of the housings $A'$ and beneath the spindle $a$, said guide-plate being secured at its upper end to the housing $A'$ and at its lower end to the table A. The screws $e^2$ extend through the slot $e^3$ of plate $e^4$ and are tapped into the bracket $e$. Washers are interposed between the heads of screws $e^2$ and the guide-plate, and the bracket, with the screws and washers, forms a cross-head which slides in the slot $e^3$ of guide-plate $e^4$.

A bell-crank lever F is pivoted at the point $f$ to lugs extending up from the bed-plate of housing $A'$, said bell-crank lever having the long arm $f'$ and the short arm $f^2$. The long arm $f'$ of said bell-crank lever has the slot $f^3$ in its outer end, said slot engaging the stud $e^5$, which extends from bracket $e$ out through slot $e^3$ of guide-plate $e^4$. The free end of bell-crank arm $f^2$ is connected by the link $f^4$ to the free end of crank-arm $e^7$, said crank-arm being secured to the forward end of rock-shaft $g$. The rock-shaft $g$ extends through and beyond the housing $A'$, the opening in said housing forming a bearing for the forward end of said shaft, its rear end finding a bearing in the bracket $g'$, which is secured to the rear of said housing. This shaft carries the ratchet-toothed cam $g^2$ and the toothed segment $g^3$, having the notches $g^4$ formed between the teeth of said segment, all for a purpose to be more fully hereinafter described. A link $h$, having the slot $h'$ therein, connects the outer end of arm $f^2$ of bell-crank lever F with the arm $i$ of swinging frame I. The slot $h'$ of link $h$ engages the stud $f^5$, projecting back from the outer end of bell-crank-lever arm $f^2$. The frame I has the lugs $i'$ projecting down from same, said lugs having openings to receive rod $i^2$, said rod being held at its front end in the support $i^3$ and at its rear end in the bracket $i^4$, said bracket being secured to the housing $A'$. The frame I supports the mechanism for cutting and inserting an adhesive material at the bottom of the trousers-leg, said adhesive material being preferably a gum-tissue fed in small pieces or sections cut from the ribbon $j$, which is fed from a roll held within the case J, said ribbon passing from same through the guide $J'$, as shown most clearly in Fig. 1. The guide $J'$ is preferably twisted slightly, so as to feed the tissue at an angle to the feeding-belts for the purpose of insuring the proper guiding thereof. The ribbon is carried by two pair of belts, said belts working upon rollers. The first pair of belts $k$, carried by the power-rollers $k'$ and idle rollers $k^2$, receive the ribbon of gum-tissue between them and feed it forward to the second pair of belts $k^3$, which work over the power-rollers $k^4$ and idle rollers $k^5$ The belts $k^3$ are narrower than the belts $k$, and between the two pairs of belts are located the shears for cutting the gum-tissue into small sections or squares, the shears being composed of the stationary blade or die $l$ and the movable blade or cutter $l'$. The rollers $k'$ $k^2$ $k^4$ $k^5$ are journaled in the blocks K, said blocks being adjustably secured to the side plates K', the side plates K' being secured to or formed integral with the bottom plate K$^2$, said bottom plate being carried by or forming a part of the frame I. The shafts $k^6$ of power-rollers $k'$ and $k^4$ extend through and beyond one of the side plates K' and have the grooved cylinders $m$ secured thereto. Set-screws $k^7$ pass through the end plate K$^3$, being threaded therein and have their ends pointed, said points entering countersinks in the outer ends of said cylinders and forming bearings therefor.

A cross-head $n$, guided by the rod $n'$ and plate $n^2$, carries the tongs N, said tongs being secured to said cross-head in any suitable manner. A rod $n^3$, working in the guide $n^4$, is secured to the cross-head $n$, said rod having the disks or collars $n^5$ secured thereto at the rear end thereof, said collars being adapted to receive the V-shaped lug $o$ on cross-head O between them, the portion of rod $n^3$ between said collars being adapted to enter the V-shaped notch $o'$, formed in said lug. The cross-head O moves upon the guide O', said guide being secured to the housing A'. A roller $o^2$, projecting from the rear face of cross-head O, engages the cam $p$ on cam-disk P, said cam-disk being keyed to the main drive-shaft C. The tongs N are formed with the lower plate N' and the upper plate N$^2$, said plates being bifurcated or cut out at their forward ends, forming practically two sets of jaws for grasping the short piece of gum-tissue at or near its ends and leaving the center of said piece of tissue free. The upper plate is pivoted to the upwardly-extending suspension-plates N$^3$, as at N$^4$, and moves between the upper and lower portions of the upper endless belt $k^3$, while the lower plate moves between the upper and lower portions of the lower belt, the upper plate being inclined at its bifurcated end to meet said lower plate and has the flat face N$^5$, which contacts with the upper face of lower plate at that point and forms the two jaws for grasping the gum-tissue. The trigger N$^6$ is pivoted to the lower plate, said trigger passing up through an opening in the upper plate and having a notch N$^7$ therein, which when forced into engagement with said upper plate acts to depress the rear end and raise the free end thereof, thus opening the jaws and holding same open until the trigger is tripped. An inclined lug is secured to and at one side of the short end of plate N$^2$, said lug moving in the path of a tripping-pawl N$^8$, said tripping-pawl being pivoted to a lug on the frame I and carrying the roller N$^9$ at its lower end in the path of said inclined lug. The pawl N$^8$ is held in practically a vertical position by the spring $n^6$, which holds said pawl back in contact with the stud or pin $n^7$. When the tongs N are drawn back, the inclined lug on short arm of plate N$^2$ comes in contact with the roller N$^9$ of pawl N$^8$, depressing said short end of plate N$^2$ and opening the jaws of the tongs. At the same time the free end of trigger N$^6$ comes in contact with the lug $n^8$ and insures the tripping of said trigger and the releasing of the upper plate N$^2$, thus allowing the jaws of the tongs to close as they are moved forward. As said tongs move forward the roller N$^9$ of pawl N$^8$ is free to move with the inclined lug, and the tongs are immediately closed by the spring $n^9$.

A frame U is suspended from the cross-head $n$ and is adapted to slide thereon, said frame carrying the studs $u'$, which are adapted to engage the cam-grooves $m'$ of cylinders $m$ and when so engaged act to rotate said cylinders, and consequently the rollers $k'$ and $k^4$, as the cross-head $n$ is moved. When the cross-head $n$ is reciprocated in the manner to be subsequently described, the frame U will slide up and down upon the cross-head $n$ to bring the studs $u'$ alternately into and out of engagement with the grooves $m'$ upon the cylinders $m$. A spring $u^2$, carrying the block $u^3$, with notches $u^4$ therein, is secured to the upper side or face of cross-head $n$, said notches being adapted to engage the projection $u^5$ on sliding frame U. Inclined lugs $u^6$ and $u^7$ are adapted to engage the frame U at each end of the stroke, the lug $u^7$, as shown in Fig. 8, being designed to throw the frame down, carrying the studs $u'$ out of engagement with the grooves $m'$, said position being shown in elevation, Fig. 6. When the cross-head $n$, carrying the frame U, moves in the direction of arrow, Fig. 8, the studs $u'$ are disengaged from the grooves $m'$. When, however, it reaches the limit of said stroke the frame comes into engagement with the lug $u^6$ and forces the frame up, carrying studs $u'$ into engagement with the grooves $m'$, at which time the projection $u^5$ on frame U will seat itself in the end notch $u^4$ of spring $u^2$. The studs $u'$ being in engagement with the grooves $m'$ of cylinders $m$, the cylinders will be revolved as the cross-head $n$ moves, carrying frame U in the direction opposite to that represented by arrow, Fig. 8. When the cross-head $n$, carrying frame U, reaches the end of said stroke, the wedge $n^i$ acts to throw said frame U out of engagement, so that in the next movement in the direction of arrow the cylinders are not revolved. The grooves $m'$ are formed with the straight or horizontal grooves $m^2$ about midway of the cylinder and the spiral or cam grooves $m^3$ $m^4$, which follow around said cylinder in opposite directions from said straight portion to each end thereof, each portion $m^3$ reaching halfway around the cylinder and the two of said spiral grooves forming a practically continuous spiral or cam, with the straight portion $m^2$ interposed in the center thereof. Fig. 24 shows the surface of one of the cylinders rolled out flat and showing practically the shape of the cam-groove $m'$. It will thus be seen that as the cross-head $n$, carrying the frame U, moves in the direction opposite to the arrow, Fig. 8, the studs $u'$ being in engagement with grooves $m'$, the cylinders will be revolved a half-revolution while the studs $u'$ are traveling in the cam-grooves $m^3$. Then while the studs follow the straight portion $m^2$ of said groove the cylinder will remain stationary, and while the studs $u'$ are following the cam-grooves $m^4$ the cylinder will be revolved the remaining half-revolution until the studs $u'$ are thrown out of engagement therefrom by contact with the lug $u^7$.

The movable blade or knife $l'$ is pivoted, as shown at $l^2$, said knife having the finger $l^3$ extending upwardly from said pivotal point to be engaged by the lower edge of plate $l^4$ to hold the knife up in the position shown in Fig. 7. A spring $l^5$ acts to force the knife down when released. The plate $l^4$ is attached to the under face of rod $n^3$ and has the notch $l^7$ cut in its lower face, allowing the finger $l^3$ to enter therein at the proper time. A finger $l^6$ projects from frame U, said finger being in such position as to engage the end of finger $l^3$ as the cross-head moves in direction of arrow, Fig. 7, thus holding knife up; but when the frame U is moved by contact with lug $u^6$ said finger $l^6$ is carried thereby out of line with finger $l^3$, and when frame U is carried by cross-head $n$ in a direction opposite to the arrow the finger $l^3$ is allowed to enter the notch or opening $l^7$ of bar $l^4$, and the knife $l'$ is forced down by spring $l^5$. This movement of the knife occurs while the studs $u'$ are traveling in the straight or horizontal portion $m^2$ of groove $m'$, thus allowing the knife $l'$ to fall and cut the gum-tissue while the belts $k$ and $k^3$ are stationary and the feeding operation temporarily suspended, as will more fully appear hereinafter.

The frame I is adapted to swing upon the rod $i^2$, said swinging operation being performed by means of the handle $i^5$, secured to the lever $i$, which may be grasped by the hand of the operator. A latch-lever $i^6$ is pivoted to the handle $i^5$, the free end $i^7$ of which is adapted to engage the outer end of a lever $q$, said lever being pivoted to the frame I at $q'$ and adapted to engage one of the notches $q^2$ or $q^3$ to hold the frame from movement. The lever $i^6$ also carries the plunger $i^8$, which is adapted to enter an opening in the bracket $i^4$ when the frame is swung back to its limit.

When it is desired to swing the frame I back and throw it and its parts out of operation, the operator grasps the handle $i^5$, compressing the latch-lever $i^6$, forcing the lever $q$ out of engagement with the lower notch $q^3$, when by pressing down upon the handle the frame is swung back, the rod $n^3$ and collars $n^5$ being disengaged from the notch $o'$ of lug $o$, and when frame is swung back by releasing the latch-lever $i^6$ the plunger $i^8$ is forced by a spring into the opening previously mentioned and the frame locked in said position.

During the sealing operation the turned-up portion of the trousers must be held away from the main body of same at the point where the tongs enter carrying the small piece of gum-tissue, the purpose being to deposit said small piece of gum-tissue between said turned-up portion and the body of the trousers. To accomplish this, I employ the skeleton wedge $r$, which is better shown in Fig. 7, said wedge being formed of a lower straight bar $r'$, which, as indicated in said figure, passes on top of the main body of the trousers and the upper bar $r^2$, said upper bar being inclined, as shown, to meet said lower bar and form therewith a wedge. The upper bar $r^2$ passes under the turned-up end of the trousers, and the two portions are thus held apart, allowing the tongs $n^2$ to carry the gum-tissue and deposit the same therein. The wedge is adapted to slide in suitable guides in the frame and is connected at its forward end outside of the frame by the arm $r^3$ to the rod $r^4$, said rod being guided in the frame and having the collar $r^6$ and a spring $r^7$ surrounding said bar and being interposed between the said collar and the guide $r^8$. A trigger $s$ is shown, Fig. 5, as engaging a notch $r^9$ in the rod $r^4$, said notch being formed in said bar near the rear end thereof. The trigger $s$ has the slots $s'$ formed therein, said slots being engaged by the screws $s^2$, said screws being tapped into the rear face of plate $r^8$, which form a guide for the trigger $s$. The trigger $s$ has the depending portion $s^3$, which bears against the short end $q^4$ of latch $q$, said depending portion or foot $s^3$ being in line with the ratchet-toothed pusher-frame $t$.

During the process of sealing the bottom of trousers-leg it is necessary to moisten the goods, and for this purpose I provide the sponge $w$, secured in any suitable manner in the receptacle $w'$, said receptacle having the guides $w^2$ formed thereon which slide in the guideways $w^3$, said guideways being secured to one of the uprights $a'$ of housing A'. A stem $w^4$ extends up from the receptacle $w'$ and has a seat therein for the reception of the taper valve $y$, said stem being bifurcated at its upper end to receive one end of bell-crank lever $w^5$, pivoted at $w^6$ to the plate $w^7$, said plate being secured to the movable block $A^2$, as shown in Fig. 1. The free end of the other arm of bell-crank lever $w^5$ is connected by a link $w^8$ to a pin or stud $o^8$, said pin entering the slot $o^9$, formed in the free end of said link $w^8$.

The stem $w^4$ has the passage $y'$ therein, leading from the valve-seat to the inside of receptacle $w'$. A taper valve $y^2$, in communication with the interior of reservoir $b$, has connected thereto the tubing $y^3$, said tubing telescoping with the tubing $y^4$, connected with valve-plug $y$. The valve $y^2$, telescoped tubing $y^3$ and $y^4$, valve $y$, and passage $y'$ connect the water-reservoir $b$ with the sponge-receptacle $w'$. The sponge-receptacle $w'$ is operated to move up and down, sliding in the guideways $w^3$ and operated by the bell-crank lever $w^5$ and link $w^8$ through movement of cross-head O. When the sponge $w$ and receptacle $w'$ are raised, the valves $y$ and $y^2$ are closed, and when said receptacle is lowered said valves $y$ and $y^2$ are opened, allowing of direct communication between the reservoir $b$ and sponge $w$, said valves opening when the receptacle $w'$ is at or near its lowest limit of movement. The opening and closing of the valves is performed automatically through the movement of receptacle $w'$, as is evident from the drawings.

A presser-finger 5, adapted to press upon the trousers-leg at the point where the gum-tissue is inserted, is secured to short arm 6, said arm forming an angle with the rod 7, which is mounted to rock in the lugs secured beneath the guide-plate O', the rod 7 having at its rear end a bent-up portion forming the arm 9, said arm carrying the roller 10. The roller 10 bears against the face of cam-disk P in line with the cam-lug 11, which operates upon the roller 10 of the arm 9 to rock the rod 7 and lift the presser-finger 5 from the trousers-bottom and allow the gum-tissue to be inserted. When the lug 11 passes beyond the roller releasing the arm 9, the finger 5 is returned by means of the spring 12, which is attached to outer end of lever 13, said lever in turn being secured or keyed to the rod 7. The spring 12 is secured at its opposite end to the projection 14 of frame I. I also provide for inserting and properly spacing the required number of pieces of gum-tissue to thoroughly seal the trousers-bottoms by means of an automatic tripping device, which I will now proceed to describe.

A pusher $t$, having a slot $t'$ therein, is mounted to slide upon the guide $t^2$ and has the depending portion $t^3$, from which the finger $t^4$ extends back through an opening in the web $A^6$, the end of said finger being adapted to press against the toothed cam $g^2$, its movement being limited thereby. The upper side of the pusher $t$ has the ratchet-teeth $t^5$ cut therein, said teeth being engaged by the pawl 15, pivotally attached to the lower end of lever 16, said lever being pivoted at 17 to the rear face of housing A'. The upper longer arm of lever 16 carries the roller 18, which is adapted to be engaged by a cam-lug 19, secured to the cam-disk P. When the cam-disk revolves, the lug 19 comes in contact with the roller 18 and acts through lever 16 and pawl 15 to advance the frame $t$ the distance of one tooth or more, as may be desired. After the lug 19 of cam-disk has passed the lever 16 is returned to its normal position by a spring and the pawl 15 drops back in position to engage another tooth, the frame being held from returning by the pawl 20, pivoted at 21 in any suitable manner, as to a lug projecting from the web $A^6$, said pawl being normally held in engagement with the teeth $t^5$ of frame $t$ by means of a spring. The pawl 15 in moving back rides upon the guide-plate $t^2$ and is thereby held normally out of engagement with the teeth of frame $t$, thus allowing the frame to recede when tripped, as will be subsequently described. The free end of pawl 20 carries a roller 22, which is adapted to be engaged by the inclined face 23 of a bell-crank lever 24, said bell-crank lever 24 being pivoted at 25 to the rear face of housing A' and held normally in the position shown in Fig. 9 by means of leaf-spring 26. The outer end of arm 27 of bell-crank lever 24 is inclined, as shown in Fig. 9, and is adapted to be engaged by the finger 28, (see Fig. 11,) which projects from the arm 14 of frame I when said frame is swung to its operative position. Such engagement of finger 28 with arm 27 depresses said arm, and the inclined face 23 engages the roller 22, lifting the pawl 20 and releasing it from engagement with pusher $t$. Projecting from the guide $t^2$ is the guide-rod 29, which passes through an opening in end plate of pusher $t$ and extends beyond the same. A coil-spring 30, surrounding the guide-rod, is attached at its outer end to said guide-rod, its opposite end being secured to end plate of said pusher in such a manner that when the pusher is drawn forward the spring is extended. When the pawl 20 is tripped in the manner previously explained, the spring 30 will contract and draw the pusher $t$ back until the end of finger $t^4$ strikes the ratchet-toothed cam, said cam limiting the movement of said finger, and consequently of the pusher $t$. A lever 31, pivoted at or near its center to a lug extending from the housing A', as at $31\frac{1}{2}$, carries the stud 32 at its free end in position to engage the depending portion $t^3$ of pusher $t$. The opposite or lower end of said lever is connected by the link 33 to the extending arm 14 of frame I. As the frame I is swung back out of working position the lever 31, operated from said frame through link 33, acts to bring the stud 32 into contact with depending portion $t^3$ of pusher $t$ and draw said frame forward its full limit, thus extending spring 30. As the pusher $t$ is thus moved forward it is held from returning by pawl 20 until the frame I is returned to its working position, when said pawl 20 is tripped, as previously described, through bell-crank lever 24, finger 28, and the spring 30, contracting, draws pusher $t$ back until finger $t^4$ strikes cam $g^2$.

Through the mechanism just described the machine is automatically adjusted to insert the proper number of pieces of gum-tissue between the fold at bottom of trousers-leg, and when said pieces have been inserted all the way around the frame I is tripped, so that no more pieces will be inserted, and said frame $i$ and its parts are thrown out of working position. The said operation is performed in the following manner: As the frame I is swung out to its farthest point the arm $i$ is swung in, Fig. 2. The inner end of slot $h'$ of link $h$ engages the pin $f^4$ on end of bell-crank arm $f^2$, lifting the arm $f'$ of bell-crank lever, and the bracket $e$ is carried up the inclined guide $e^4$ until the roller E comes in contact with or in close proximity to the spindle $a$. The bottom of trousers which have first been turned up the proper amount is placed around spindle $a$, over idle roller $A^5$, and around roller E. The frame I is then thrown into working position and the parts are allowed to assume the position shown in Fig. 2, the spring $f^5$ acting to return the bell-crank lever F, carrying the bracket $e$ down the guide $e^4$ and the roller E therewith until the position of roller E is limited by the trousers-leg, (represented by dotted lines, as at $x$.) The circumference of the trousers-leg thus determines the positions of roller E, and consequently the bell-crank lever F. As the shaft $g$ is connected to said bell-crank lever F through the crank $e^5$ and link $e^4$ said shaft is rocked by the movement of said bell-crank lever, and the position of roller E thus determines the position of cam $g^2$ and toothed segment $g^3$, which are keyed to said shaft. The cam $g^2$ has ratchet-teeth formed on its arc face, as previously mentioned, and the position of said cam determines the position pusher $t$ may assume when pawl 20 is tripped in the manner previously described, the frame $t$ being drawn back by the spring 30 until end of finger $t^4$ comes in contact with toothed face of cam $g^2$, and thus determine the number of steps required in the movement of pusher $t$ before said frame acts to trip frame I and throw same out of engagement in a manner to be more fully described hereinafter. Suppose, for example, that the circumference of trousers-bottom were fifteen inches, (or units.) Then the position of roller E being limited by the circumference of trousers-leg it also determines the position of rock-shaft $g$ and cam $g^2$, as previously described, and the finger $t^4$ will be forced back against a tooth of cam $g^2$, allowing fifteen teeth of pusher $t$ to be operated upon or fifteen distinct forward movements of said pusher before the frame I is tripped and thrown out of operative position, the supposition in the above instance being that the trousers-bottoms are fed one inch (or unit) at each revolution of main drive-shaft C and a piece of gum-tissue inserted at each movement, said piece of tissue being approximately one inch long. Suppose, however, that the trousers-bottom were fifteen and one-half ($15\frac{1}{2}$) inches (or units) in circumference. Then there would be a space of one-half ($\frac{1}{2}$) inch between the first piece of gum-tissue inserted and the last one, and therefore said half-inch would not be sealed. To provide for this, I have devised a means whereby the trousers-bottoms are fed a somewhat greater distance than in the previous instance, thus taking up a sufficient portion of the one-half ($\frac{1}{2}$) inch at each step to properly space each insertion and make the first and last insertions correspond in spacing to the spacing of the other pieces of tissues. The said device consists in so mounting the tripping-lug $d$, which releases the ratchet-toothed pawl $c^8$ from ratchet-wheel $a^6$, as to allow for increasing the play of said pawl before being released or tripped, thus rotating the ratchet-wheel $a^6$, and consequently the spindle $a$, a somewhat greater distance before said pawl $c^8$ is tripped. To accomplish this, I have mounted the tripping-lug $d$ at the lower end of a vertically-movable rock-shaft D, said rock-shaft being guided in sleeve $d^2$, which is secured by means of a bracket to housing $A'$. The rock-shaft D has a pin $d^3$ extending through its upper end which bears against the upper face of sleeve $d^2$ and limits the downward movement of rock-shaft D in said sleeve. A spring $d^4$ is arranged to lift the plunger and hold the bar $d^5$, secured to said rock-shaft, normally up against the bottom face of sleeve $d^2$ and allowing of a slight amount of play for pin $d^3$ above upper face of sleeve $d^2$. The stop $d$ is secured to bar $d^5$, and for purposes of adjustment I use a set-screw threaded into said bar and having the jam-nut $d^6$ thereon to secure said set-screw firmly in the desired position. The rock-shaft D has the rod $d^7$ extending through bar $d^5$, which is located beneath sleeve $d^2$, said bar having the crank-arm $d^8$ secured thereto. A notch $d^9$ is cut in the upper face of sleeve $d^2$ for a purpose which will more fully hereinafter appear. A link 34 connects the outer end of crank-arm $d^8$ with the sliding frame 35, said frame being secured to the rod 36, which slides in a bearing 37, formed in bracket $g'$. A threaded pin 38, secured to bracket $g'$, passes through an opening in sliding frame 35, and a thumb-nut 39, threaded upon said pin, limits the movement of said sliding frame. A pin 40, upon the outer end of rod 36, enters a slot 41 in a lever 42, pivoted at or near its center, as at 43, to a projection from web $A^6$. The opposite end of said lever is connected by a link 44 to arm 14 of frame I. The link 44 is connected to the arm 14 by means of the sleeve 45, with which said link telescopes, and is so connected by means of springs as to allow of said link connection to adapt itself to any desired length. A lug 46, upon end of sliding frame 35, is adapted to bear against the face of segment $g^3$, either against a tooth 47 or to enter one of the notches 48, formed between same. The segment $g^3$ is so positioned on shaft $g$ that when a trousers-leg whose circumference measures an even number of units is placed in the machine around the spindle $a$ and roller E the position of shaft $g$ being thus determined regulates the position of segment $g^3$, so that the lug 46 rests against one of the teeth 47 of said segment and through link 34 and crank-arm $d^8$ turns the plunger-shaft $d'$ into such a position that pin $d^3$ will be carried against the upper face of sleeve $d^2$, and the lug on pawl $c^3$ coming in contact with head of set-screw $d$ as the lever $C^5$ descends will trip said pawl, so that each downward movement of arm $c^5$ will revolve spindle $a$ a sufficient distance to take up or feed the trousers-leg one inch or unit. If, however, the trousers-bottom should measure a certain number of units plus a fraction, it will be necessary to feed the trousers-leg a fraction more than the unit at each movement, so that the pieces of gum-tissue may be evenly spaced. When frame I is thrown back previous to inserting the trousers-leg, the link 44 is thrust forward through its spring connection with arm 14, and through lever 41 the rod 36 is drawn back and lug 46 on sliding frame 35 is withdrawn from contact with face of segment $g^3$. When the trousers-leg has been inserted and the frame I thrown over to working position, the odd measurement of circumference of trousers-leg will so determine the position of segment $g^3$ on shaft $g$ that as arm 14 is moved back by movement of frame I into working position the link 44, moving therewith, operates lever 41 and rod 36 and allows lug 46 on sliding frame 35 to enter a notch 48 on segment $g^3$, and the movement of lug 46 into said notch allows lever 34 to swing crank $d^8$ and turn rock-shaft D into such a position as to bring pin $d^3$ over notch $d^9$ in face of sleeve $d^2$. When the machine is operated and lever $C^5$ descends, carrying pawl $c^3$ in engagement with ratchet-wheel $a^6$ and operating to revolve said ratchet-wheel, the lug on said pawl strikes against the head of set-screw and forces said set-screw down until pin $d^3$ on rock-shaft D enters notch $d^9$, and the pawl $c^3$ is not disengaged from ratchet-wheel $a^6$ until said pin strikes the bottom of said notch, holding rock-shaft D, and consequently set-screw $d$, from further downward movement. Thus it will be seen that when rock-shaft D' is so turned as to bring pin $d^3$ over notch $d^9$ the ratchet-wheel $a^6$ is revolved a somewhat greater distance than when pin $d^3$ is brought into contact with upper face of sleeve $d^2$. This greater movement of said ratchet-wheel increases the distance spindle $a$ moves, thus feeding a somewhat greater portion of the trousers-leg at a time, and in this manner takes up a sufficient amount of the extra fractional measurement of trousers-leg as to equally space the pieces of gum-tissue The operation of my machine is as follows: The trousers-leg is first turned up the required amount at the bottom, as shown in Fig. 28, and said turned-up portion is placed over the spindle $a$, with the center of front part of trousers-bottom directly over the small roughened roller $A^5$, beneath the presser-finger 5, and around the roller E. In inserting the trousers-leg care should be taken to press said trousers-bottom tightly against the cam-guide $A^3$, so that said trousers-bottom will take the proper shape during the sealing operation. Before the trousers-leg is inserted the frame I is thrown back out of the way, thus bringing the roller E up near the spindle $a$. The lever $b'$ is thrown forward, raising the block $A^2$ and hollow cylinder $a^2$, thus allowing sufficient space for inserting the trousers-leg. When the trousers-bottoms have been properly placed, the hollow cylinder $a^2$, which has been previously heated by the flame of the gas-pipe $z$, is lowered by throwing back the lever $b'$. The frame I is thrown in and the skeleton wedge $r$ pressed forward by the hand of the operator until the nose of said skeleton wedge enters between the main body of trousers and the turned-up portion, holding said turned-up portion away a sufficient distance from said main portion to allow space for the tongs to enter therein. The strip of gum-tissue $j$ is then inserted between the belts $k$ and the tissue worked up between said belts in proper position to be cut and fed to the tongs N, it being desirable to first work the machine sufficiently before putting the trousers-leg in place, so that the tongs may have a piece of gum-tissue between their jaws ready to be inserted. As the frame I is moved into place the position of roller E is determined, the roller being forced down and out until held from further movement by the trousers-leg, which is held taut over spindle $a$ and said roller E, the positions of cam $g^2$ and toothed segment $g^3$ being thus determined, as previously described, so that the further movement of frame I into position brings the finger 28 into contact with bell-crank lever 24, lifting pawl 20 and allowing pusher $t$ to be drawn back by the contraction of spring 30 until the finger $t^4$, coming in contact with the face of cam $g^2$, limits the further backward movement of frame $t$. At the same time the lug 46 of sliding frame 35 is forced into contact with segment $g^3$, either bearing against a tooth 47 if the trousers-leg measures an exact number of units, or it is pressed into one of the notches 48 if the trousers-leg should measure a certain number of units plus a fraction. The throwing in of the frame I allows the presser-finger 5 to press against the material immediately over the roughened roller $A^5$. As the machine is operated the finger is raised by the cam-lug 11, and the cam $p$, operating against roller $o^2$ on cross-head O, acts through the mechanism previously described to move the tongs N, carrying a piece of gum-tissue 50 into the space between the turned-up portion and main body of trousers-leg. As the tongs move in near the limit of their stroke the trigger $N^8$ is pressed back by set-screw $N^9$, so that the notch $N^7$ is forced upon a roller journaled at edge of opening in plate $N^2$, so as to depress the rear end and raise the forward end of said plate, opening the jaws of the tongs and releasing the gum-tissue, which is then held by the finger 5, being forced down by spring 12, which operates through lever 13 to rock the shaft 7, said finger having been previously raised by cam-lug 11 striking roller 10 and operating to rock the shaft 7, thus raising finger 5 a sufficient length of time to allow the tongs to enter, carrying the piece of gum-tissue. The gum-tissue being inserted, the tongs opened, and said gum-tissue held by means of finger 5, the further operation of the machine causes the tongs to recede, said jaws remaining open until the tongs reach the limit of back stroke. While the tongs moved forward the depending frame U was moved by contact with the lug $u^6$ to force the studs $u'$ into the grooves $m'$ of cylinders $m$. As the cross-head $n$, carrying the tongs N, recedes the frame U, depending from said cross-head, with the studs $u^6$ bearing in cam-grooves $m'$, acts to revolve said roller $n$, and consequently the rollers $k'$ and $k^4$, feeding the ribbon of gum-tissue $j$ forward, said ribbon being carried between the endless belts $k$ and fed to and partially between the belts $k^3$. When the studs $u'$ enter the straight portion of cam-grooves $m^2$, the revolving of cylinders $m$ and rollers $k'$ temporarily ceases, thus causing an interval of rest in the feeding of said gum-tissue and allowing for the knife $l'$ to descend and cut off the portion of gum-tissue fed beyond the point of cutting. While the studs $u'$ are moving in said straight portion $m^2$ of grooves $m'$, the notch $i^6$ in bar $i^4$ is brought into position over the finger $l^3$, allowing the spring $l^5$ to force the knife down and cut said tissue. As the cross-head continues to recede, the knife $l'$ is raised by the bar $l^4$ again coming into contact with end of finger $l^3$, forcing same down and raising the knife. The studs $u'$ then enter the cam portion $m^4$ of grooves $m'$ and during their passage therein act to again revolve said cylinder and rollers, feeding the portion of gum-tissue just cut off to the tongs, and likewise feeding the ribbon an equal distance. When the cross-head $n$ reaches the end of back stroke, the frame U comes in contact with wedge-block $u^7$, and said frame moves back upon said cross-head, withdrawing the studs $u'$ from the cam-grooves $m'$, so that as the frame is moved forward by the next stroke of cross-head the cylinders $m$ are not revolved and the ribbon $j$ is not fed forward until the next back stroke of said cross-head. As the cross-head $n$, carrying tongs N, recedes, the jaws remain open until the limit of stroke is reached, when the trigger $N^6$ is tripped by coming into contact with plate and the jaws are closed by the springs $n^9$, said jaws closing upon and holding between them the strip of gum-tissue which has been cut off and fed forward between belts $k^3$. Thus as the machine is operated the belts feed the gum-tissue on the back stroke of cross-head first to the cutting-knife, where a short length is cut off, and then feed said short length to the tongs, which grasp same and on the forward stroke of cross-head carry the short length of tissue in between the fold at bottom of trousers-leg and deposit same one after another the trousers-leg being fed forward a sufficient distance between each insertion until said lengths of gum-tissue have been deposited all the way around, at which time the pusher $t$, having been moved forward in the manner previously described, comes in contact with the foot $s^3$ of latch $s$, releasing the rod $r^5$, which being thrust back by spring $r^7$ withdraws the skeleton wedge $r$ from the fold of trousers-leg, and at the same time the foot $s^3$, pressing against the short end of latch $q$, releases said latch from the notch $q^3$, and the frame I is thrown back out of working position by the pusher $t$ a sufficient distance to withdraw the rod $n^3$, with collars $n^5$, from notch $o'$ of lug $o$. In this manner the parts feeding the gum-tissue are thrown out of operation and the feeding of gum-tissue is discontinued. While the machine is in motion the movement of cross-head O acts through a stud $o^3$, working in slotted end of link $w^8$, to oscillate the bell-crank lever $w^5$, thereby raising and lowering the sponge $w$ in guides $w^3$, pressing said sponge against the work when feed-spindle $a$ is stationary and raising same when feeding mechanism is in motion. As sponge descends to its lowest position the valves $y$ and $y^2$ are opened and water is admitted from reservoir $b$ to sponge $w$, saturating said sponge and allowing the moistening of goods. When sponge is raised, the valves $y$ and $y^2$ automatically close, shutting off the flow of water until said sponge again descends. After the frame I has been thrown out of working position the machine is sufficiently operated to allow the piece of gum-tissue which was last inserted to be fed to and between the spindle $a$ and heated cylinder $a^2$, completing the sealing operation. The lever $b'$ is then thrown over, raising reservoir $b$ and block $A^2$, carrying cylinder $a^2$. The frame I is then thrown clear back by means of handle $i^5$, and the trousers-leg is thus freed, so that it may be removed and another inserted. As the heated cylinder $a^2$ moves at a higher rate of speed than spindle $a$, said movement operates to take up the slack in upturned portion of trousers-leg, so as to keep said upturned portion in proper line with the main body of trousers-leg. At the same time the more rapid movement of said cylinder acts, in conjunction with the former $A^3$, to so feed the material that the trousers-leg will take the proper shape at bottom and allowing for a shorter measurement at the front of same than at the back.

I do not wish to be considered as limiting myself to the exact details of construction herein shown and described, as it is evident that certain changes may be made without departing from the spirit of my invention.

While I have shown and described my machine as applied to the sealing of hems of trousers-bottoms, I do not wish to be limited thereto, as the machine may be readily adapted to the sealing of hems on various other garments or articles, such as skirt-bottoms and the like. It is merely necessary in that case to place the stretcher-roller E a suitable distance from the spindle a to accommodate the skirt or other article to be hemmed; but the construction and mode of operation of the machine will remain the same. Such adaptation of the machine I intend to include in the claims as expressed.

Having now fully described my invention, what I claim, and desire to secure by Letters Patent, is—

1. In a machine for finishing or sealing hems of garments, a support for the garment, mechanism for inserting an adhesive substance to the fold of the hem, and mechanism for pressing said fold.

2. In a machine for finishing or sealing hems of garments, a support for the garment, mechanism for imparting an intermittent movement to said support, mechanism for inserting an adhesive substance to the fold of the hem, and mechanism for pressing said fold.

3. In a machine for finishing or sealing hems of garments, a support for the garment, mechanism for feeding an adhesive substance to the fold of the hem, pressing mechanism, and means for heating said pressing mechanism.

4. In a machine for finishing or sealing hems of garments, a support for the garment, mechanism for feeding an adhesive substance to the fold of the hem, pressing mechanism, and means for moistening said garment.

5. In a machine for finishing or sealing hems of garments, a support for the garment comprising a rotary spindle, and a stretcher adapted to hold the material taut.

6. In a machine for finishing or sealing hems of garments, a support for the garment, means for giving it an intermittent step-by-step movement, mechanism for feeding an adhesive substance to the fold of the hem, a stretcher, and means controlled by said stretcher for determining the amount of adhesive material fed to the hem.

7. In a machine for finishing or sealing hems of garments, a support for the garment, means for giving said support an intermittent step-by-step movement, mechanism for feeding an adhesive substance to the fold of the hem, means for rendering said feeding mechanism inoperative, a stretcher, and means controlled by the stretcher for controlling the last-named means.

8. In a machine for finishing or sealing hems of garments, a support for the garment comprising a rotary spindle, a stretcher adapted to hold the material taut, and a cam-guide encircling a portion of said spindle.

9. In a machine for finishing or sealing hems of garments, a rotary spindle, a stretcher, a swinging frame, feed mechanism carried by said frame for feeding an adhesive substance to the fold of the hem, and connections between said frame and said stretcher.

10. In a machine for finishing or sealing hems of garments, a main drive-shaft, a rotary spindle, connections between said shaft and spindle, a stretcher, a swinging frame, feed mechanism carried by said frame for feeding adhesive substance to the fold of the hem, a pusher, connections between said stretcher and pusher-regulating mechanism, and connections between the drive-shaft and said pusher.

11. In a machine for finishing or sealing hems of garments, a main drive-shaft, a rotary spindle, connections between said shaft and spindle, a stretcher, a swinging frame, feed mechanism carried by said frame for feeding an adhesive substance to the fold of the hem, a pusher, a rock-shaft, connections between said rock-shaft and said stretcher, a cam on said rock-shaft in the path of said pusher, and connections between said drive-shaft and said pusher.

12. In a machine for finishing or sealing hems of garments, a main drive-shaft, a rotary spindle, connections between said shaft and spindle, a stretcher, a swinging frame, feed mechanism carried by said frame for feeding an adhesive substance to the fold of the hem, a pusher, a rock-shaft, connections between said rock-shaft and said stretcher, a cam on said rock-shaft, a finger on said pusher in the path of said cam, and connections between said drive-shaft and said pusher.

13. In a machine for finishing or sealing hems of garments, a main drive-shaft, a rotary spindle, connections between said shaft and spindle, a stretcher, a swinging frame, feed mechanism carried by said frame for feeding an adhesive substance to the fold of the hem, a pusher having ratchet-teeth thereon, a rock-shaft, connections between said rock-shaft and said stretcher, a cam on said rock-shaft in the path of said pusher, a pawl engaging said pusher, and connections between said drive-shaft and said pusher.

14. In a machine for finishing or sealing hems of garments, a main drive-shaft, a rotary spindle, connections between said shaft and spindle, a stretcher, a swinging frame, feed mechanism carried by said frame for feeding an adhesive substance to the fold of the hem, a pusher having ratchet-teeth thereon, a rock-shaft, connections between said rock-shaft and said stretcher, a cam on said rock-shaft in the path of said pusher, a pawl engaging said pusher, an arm, a pawl on said arm adapted to engage the ratchet-face of said pusher, and cam mechanism carried by the main drive-shaft and operating said arm.

15. In a machine for finishing or sealing hems of garments, a main drive-shaft, a rotary spindle, connections between said shaft and spindle, a stretcher, a swinging frame, feed mechanism carried by said frame for feeding an adhesive substance to the fold of the hem, a spring-actuated pusher, connections between said stretcher and pusher-regulating mechanism, tripping mechanism carried by the frame, and connections between said drive-shaft and said pusher.

16. In a machine for finishing or sealing hems of garments, a main drive-shaft, a rotary spindle, connections between said shaft and spindle, a stretcher, a swinging frame, feed mechanism carried by said frame to feed an adhesive substance to the fold of the hem, a pusher, a rock-shaft, connections between said rock-shaft and said stretcher, a cam on said rock-shaft in the path of said pusher, a ratchet-wheel on the spindle-shaft, a pawl adapted to engage the teeth of said ratchet-wheel, connections between said pawl and the drive-shaft, and a stop in the path of said pawl.

17. In a machine for finishing or sealing hems of garments, a main drive-shaft, a rotary spindle, connections between said shaft and spindle, a stretcher, a swinging frame, feed mechanism carried by said frame to feed adhesive substance to the fold of the hem, a pusher, a rock-shaft, connections between said rock-shaft and said stretcher, a cam on said rock-shaft in the path of said pusher, a ratchet-wheel on the spindle-shaft, a pawl adapted to engage the teeth of said ratchet-wheel, said pawl having a lug on its rear face and a stop in the path of said lug.

18. In a machine for finishing or sealing hems of garments, a main drive-shaft, a rotary spindle, connections between said shaft and spindle, a swinging frame, feed mechanism carried by said frame to feed an adhesive substance to the fold of the hem, a pusher, a rock-shaft, connections between said rock-shaft and said stretcher, a cam on said rock-shaft in the path of said pusher, a toothed segment on said rock-shaft, a sliding frame adapted to engage the periphery of said segment, a ratchet-wheel on the spindle-shaft, a pawl adapted to engage the teeth of said ratchet-wheel, connections between said pawl and the drive-shaft, a vertically-movable rock-shaft, a stop carried by said rock-shaft in the path of said pawl, and connections between said rock-shaft and said sliding frame.

19. In a machine for finishing or sealing hems of garments, a main drive-shaft, a rotary spindle, connections between said shaft and spindle, a swinging frame, feed mechanism carried by said frame to feed an adhesive substance to the fold of the hem, a pusher, a rock-shaft, connections between said rock-shaft and said stretcher, a cam on said rock-shaft in the path of said pusher, a toothed segment on said rock-shaft, a sliding frame adapted to engage the periphery of said segment, a ratchet-wheel on the spindle-shaft, a pawl adapted to engage the teeth of said ratchet-wheel, connections between said pawl and the drive-shaft, a vertically-movable rock-shaft, a stop carried by said rock-shaft in the path of said pawl, connections between said rock-shaft and said sliding frame, and a lug on said vertically-movable rock-shaft adapted to enter a seat in the bearing for said shaft.

20. In a machine for finishing or sealing hems of garments, a main drive-shaft, a rotary spindle, connections between said shaft and spindle, mechanism for imparting an intermittent movement to said spindle, a stretcher, mechanism for feeding an adhesive substance to the fold of the hem, and mechanism for varying the amount of said intermittent movement.

21. In a machine for finishing or sealing hems of garments, a support for the garment, means for giving said support an intermittent step-by-step movement, mechanism for feeding an adhesive substance to the fold of the hem, a stretcher, and means controlled by said stretcher for varying the length of the intermittent movements to be given to the support.

22. In a machine for finishing or sealing hems of garments, a support for the garment, means for giving an intermittent step-by-step movement to said support, mechanism for feeding an adhesive substance to the fold of the hem, a stretcher, and mechanism controlled thereby for varying the length of the intermittent step-by-step movement given to the garment and for controlling the amount of adhesive substance fed to the hem.

23. In a machine for finishing or sealing hems of garments, a support for the garment, means for giving an intermittent step-by-step movement to said support, mechanism for feeding an adhesive substance to the fold of the hem, means for rendering said feeding mechanism inoperative, a stretcher, and means controlled by said stretcher for varying the amount of intermittent movement given to the garment-support and for controlling the means which render the feeding mechanism inoperative.

24. In a machine for finishing or sealing hems of garments, a main drive-shaft, a rotary spindle, connections between said shaft and spindle, mechanism for imparting an intermittent movement to said spindle, a stretcher adapted to move to and from said spindle in an inclined guide, a spring-actuated bell-crank, a rock-shaft, connections between said bell-crank and rock-shaft, a swinging frame, feed mechanism on said frame for feeding an adhesive substance to the fold of the hem, a pusher, connections between said drive-shaft and pusher, and pusher-regulating mechanism carried by said rocker-shaft.

25. In a machine for finishing or sealing hems of garments, a drive-shaft, a rotary support for the garment, connections between said shaft and rotary support, mechanism for feeding an adhesive substance to the fold of the hem, a presser, a moistening device, valves controlling the flow of liquid to said moistening device, and connections between said valves and said drive-shaft.

26. In a machine for finishing or sealing hems of garments, a drive-shaft, a rotary support for the garment, connections between the drive-shaft and rotary support, mechanism for feeding an adhesive substance to the fold of the hem, a moistening device, and connections between said moistening device and said drive-shaft, whereby said device is pressed against the fold and withdrawn therefrom.

27. In a machine for finishing or sealing hems of garments, a drive-shaft, a rotary support for the garment, connections between the drive-shaft and rotary support, mechanism for feeding an adhesive substance to the fold of the hem, a holder, an absorbent body contained within said holder, a telescopic pipe connection between said holder and a suitable reservoir, valves in said connection, and connections between said holder and said drive-shaft, whereby said holder is moved to and fro.

28. In a machine for finishing or sealing hems of garments, a main drive-shaft, a rotary support for the garment, connections between the drive-shaft and rotary support, mechanism for feeding an adhesive substance to the fold of the hem, and a presser-finger adapted to hold said adhesive substance and operated by said drive-shaft.

29. In a machine for finishing or sealing hems of garments, a main drive-shaft, a rotary support for the garment, connections between the drive-shaft and rotary support, mechanism for feeding an adhesive substance to the fold of the hem, a rock-shaft, a presser-finger carried by said rock-shaft, and cam mechanism carried by the drive-shaft for operating said rock-shaft.

30. In a machine for finishing or sealing hems of garments, a support for the garment, a frame, a knife carried thereby, mechanism for feeding an adhesive substance thereto, and mechanism for conveying the cut-off portion of said adhesive material to the fold of the hem.

31. In a machine for finishing or sealing hems of garments, a support for the garment, a frame, a knife carried by said frame, mechanism for operating said knife, mechanism for feeding an adhesive material thereto to be cut thereby, mechanism for conveying said cut-off portion therefrom, and a conveyer to receive said cut-off portion and deliver the same to the fold of the hem.

32. In a machine for finishing or sealing hems of garments, a main drive-shaft, a support for the garment, a frame carrying a knife and feeding mechanism for feeding an adhesive substance to the fold of the hem, a slidable frame, connections between said slidable frame and said knife and feeding mechanism, and connections between said slidable frame and said drive-shaft.

33. In a machine for finishing or sealing hems of garments, a main drive-shaft, a support for the garment, a frame carrying a knife, and feeding-rolls for feeding an adhesive substance to said knife, cylinders having cam-grooves therein connected to said feed-rolls, a slidable frame, lugs on said slidable frame engaging said grooved cylinders, connections between said sliding frame and said drive-shaft, and mechanism for conveying the adhesive substance when cut to the fold of the hem.

34. In a machine for finishing or sealing hems of garments, a main drive-shaft, a support for the garment, a frame carrying a knife and feeding-rolls for feeding an adhesive substance to said knife, cylinders having cam-grooves therein connected to said rolls, a cross-head on said frame, a slidable member on said cross-head, projections in the path of said slidable member adapted to raise and lower the same, said slidable member having lugs adapted to engage the cam-grooves of said cylinders, connections between said cross-head and said drive-shaft, and mechanism for conveying the adhesive substance when cut to the fold of the hem.

35. In a machine for finishing or sealing hems of garments, a main drive-shaft, a support for the garment, a frame carrying a knife and feeding-rolls for feeding an adhesive substance to said knife, cylinders having cam-grooves therein connected to said rolls, a cross-head on said frame, a slidable member on said cross-head, projections having inclined faces in the path of said slidable member adapted to raise and lower same, said slidable member having lugs adapted to engage the cam-grooves of said cylinders, connections between said cross-head and said drive-shaft, and mechanism for conveying the adhesive substance when cut to the fold of the hem.

36. In a machine for finishing or sealing hems of garments, a main drive-shaft, a support for the garment, a frame carrying a knife, and feeding mechanism for feeding an adhesive substance to said knife, a slidable frame, tripping mechanism carried by said slidable frame and adapted to operate said knife, and mechanism for conveying the adhesive substance when cut to the fold of the hem.

37. In a machine for finishing or sealing hems of garments, a main drive-shaft, a support for the garment, a frame carrying a spring-actuated knife and feeding mechanism for feeding an adhesive substance to said knife, a slidable member, a finger on said knife and a sliding bar on said frame adapted to engage said finger, said bar having a notch therein, a finger carried by said slidable member adapted to engage the finger on the knife, means for throwing said finger into and out of engagement with the finger on said knife, connections between said slidable member and the drive-shaft, and mechanism for feeding the adhesive material when cut to the fold of the hem.

38. In a machine for finishing or sealing hems of garments, a main drive-shaft, a support for the garment, a frame carrying a spring-actuated knife and feeding mechanism for feeding an adhesive substance to said knife, a cross-head and finger on said knife, a bar having a notch therein adapted to move in contact with said finger, a slidable member on said cross-head, a finger projecting out from said member and adapted to engage said finger on said knife, means for raising and lowering said slidable member, connections between said cross-head and the main shaft, and mechanism for conveying the adhesive substance when cut to the fold of the hem.

39. In a machine for finishing or sealing hems of garments, a main drive-shaft, a support for the garment, a frame carrying a knife and feeding mechanism for feeding an adhesive substance to said knife, a reel for holding said adhesive substance, a guide for said adhesive substance arranged at an angle to the feeding mechanism, and connections between said feeding mechanism and said knife and said drive-shaft.

40. In a machine for finishing or sealing hems of garments, a main drive-shaft, a support for the garment, a knife, feeding mechanism for feeding an adhesive substance to said knife, reciprocating tongs adapted to grasp the adhesive material when cut, and connections between said reciprocating tongs and the main drive-shaft.

41. In a machine for finishing or sealing hems of garments, a main drive-shaft, a support for the garment, a knife, feeding mechanism for feeding an adhesive substance to said knife, reciprocating tongs adapted to grasp the substance cut by said knife, a trigger carried by the lower member of said tongs, said trigger adapted to engage the upper member to open said tongs, a stop in the path of said trigger, and connections between said tongs and the main drive-shaft.

42. In a machine for finishing or sealing hems of garments, a main drive-shaft, a support for the garment, a knife, feeding mechanism for feeding an adhesive substance to said knife, reciprocating tongs adapted to grasp the substance cut by said knife, a trigger carried by the lower member of said tongs, said trigger having a notch therein, and a stop in the path of said trigger, and connections between said tongs and the main drive-shaft.

43. In a machine for finishing or sealing hems of garments, a main drive-shaft, a support for the garment, a knife, feeding mechanism for feeding an adhesive substance to said knife, reciprocating tongs adapted to grasp the substance cut by said knife, a trigger carried by the lower member of said tongs and adapted to engage the upper member to open said tongs, stops at the forward and rear ends of said tongs, and connections between said tongs and the main drive-shaft.

44. In a machine for finishing or sealing hems of garments, a main drive-shaft, a support for the garment, a knife, feeding mechanism for feeding an adhesive substance to said knife, reciprocating tongs adapted to grasp the substance cut by said knife, a trigger carried by the lower member of said tongs, said trigger having a notch therein adapted to engage a roller on the upper member of said tongs, a stop in the path of said trigger, and connections between said tongs and the main drive-shaft.

45. In a machine for finishing or sealing hems of garments, a main drive-shaft, a support for the garment, a knife, feeding mechanism for feeding an adhesive substance to said knife, reciprocating tongs adapted to grasp the adhesive material so cut and introduce it to the fold of the hem, a trigger connected to the lower member of said tongs and adapted to engage the upper member of said tongs to operate the same, the upper face of the upper member of said tongs having an inclined lug thereon, a swinging arm in the path of said lug, a stop for said arm, and connections between said tongs and the drive-shaft.

46. In a machine for finishing or sealing hems of garments, a main drive-shaft, a support for the garment, a knife, feeding mechanism for feeding an adhesive substance to said knife, reciprocating tongs adapted to grasp the adhesive material so cut and introduce it to the fold of the hem, a trigger connected to the lower member of said tongs and adapted to engage the upper member of said tongs to operate the same, the upper face of the upper member of said tongs having an inclined lug thereon, a swinging arm in the path of said lug, a stop for said arm, said swinging arm having a roller at the end thereof, and connections between said tongs and the drive-shaft.

47. In a machine for finishing or sealing hems of garments, a main drive-shaft, a support for the garment, a knife, feeding mechanism for feeding an adhesive substance to said knife, mechanism for grasping the material so cut and inserting it in the fold of the hem, a wedge adapted to enter the fold of the trousers-bottom, and tripping mechanism for withdrawing said wedge.

48. In a machine for finishing or sealing hems of garments, a main drive-shaft, a support for the garment, a knife, feeding mechanism for feeding an adhesive substance to said knife, reciprocating bifurcated tongs adapted to grasp the material when cut, a finger adapted to enter the space between said tongs, and connections between said finger and the main shaft and between said tongs and main shaft.

49. In a machine for finishing or sealing hems of garments, a main drive-shaft, a spindle for supporting the garment, connections between said shaft and spindle, a pressing-roll, and gearing for imparting a greater speed to said pressing-roll than to said spindle.

In testimony whereof I, the said LEOPOLD NEWMAN, have hereunto set my hand.

LEOPOLD NEWMAN.

Witnesses:
G. C. RAYMOND,
ROBERT C. TOTTEN.